United States Patent [19]

Deborski et al.

[11] Patent Number: 4,469,580

[45] Date of Patent: Sep. 4, 1984

[54] METHOD OF MAKING AN IMPROVED INTERNALLY SUPPORTED ELECTRODE

[75] Inventors: Gary A. Deborski, Midland; Joseph D. Lefevre, Bay City, both of Mich.

[73] Assignee: The Dow Chemical Company, Midland, Mich.

[21] Appl. No.: 408,373

[22] Filed: Aug. 16, 1982

Related U.S. Application Data

[63] Continuation of Ser. No. 249,256, Mar. 30, 1981, abandoned.

[51] Int. Cl.³ .............................................. C25B 11/03
[52] U.S. Cl. ..................................... 204/284; 204/286
[58] Field of Search ................................ 204/284–289

[56] References Cited

U.S. PATENT DOCUMENTS

| | | |
|---|---|---|
| 2,384,463 | 9/1945 | Gunn et al. |
| 2,969,315 | 1/1961 | Bacon |
| 3,035,998 | 5/1962 | Sommer et al. |
| 3,206,332 | 9/1965 | Juda |
| 3,238,069 | 3/1966 | Guth |
| 3,244,611 | 4/1966 | Pezzack .................. 204/289 |
| 3,311,507 | 3/1967 | Dittmann et al. |
| 3,423,247 | 1/1969 | Darland, Jr. et al. |
| 3,607,403 | 9/1971 | Arrance |
| 3,632,497 | 1/1972 | Leduc |
| 3,764,277 | 10/1973 | Hollis |
| 3,873,437 | 3/1975 | Pulver |
| 3,970,539 | 7/1976 | Collins et al. ............. 204/286 |
| 4,154,667 | 5/1979 | Pohto et al. |
| 4,279,731 | 7/1981 | Pellegri |

Primary Examiner—R. L. Andrews

[57] ABSTRACT

The invention is a method of making an improved internally supported electrode which comprises:
  (a) contacting a first exposed member with a plurality of projections located on a first surface of a gas permeable support section;
  (b) contacting a second exposed member with a plurality of projections on a second surface of the support section; wherein the projections on each surface are separated by a distance of at least about 0.1 inch;
  (c) imbedding at least a portion of the projections into each of the exposed members; and
  (d) bonding the imbedded projections to each of the exposed members.

10 Claims, 3 Drawing Figures

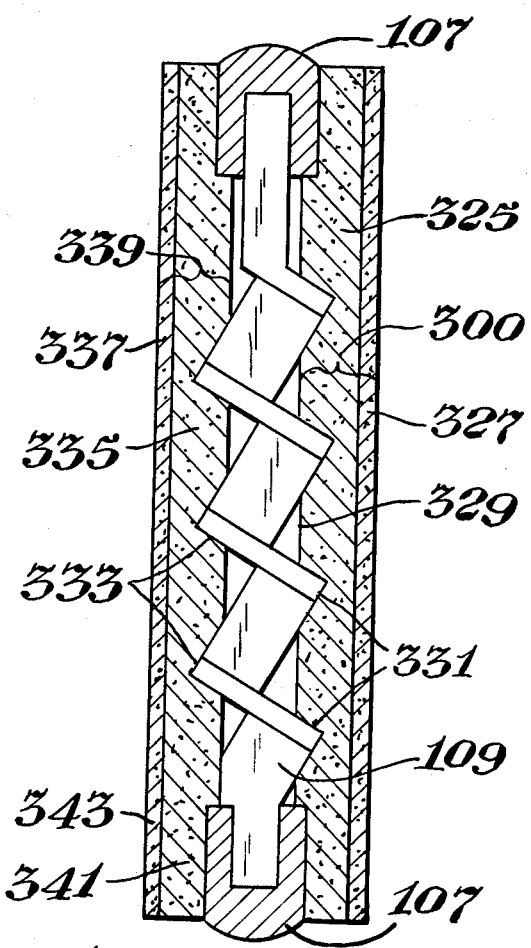
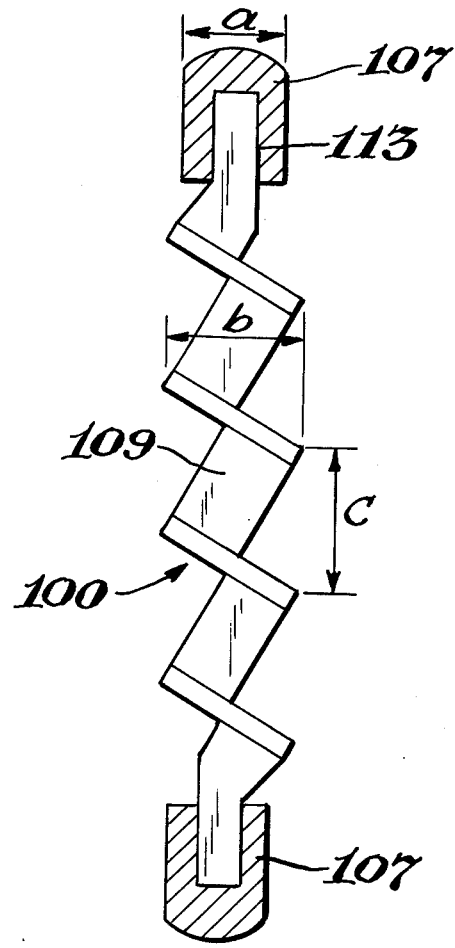
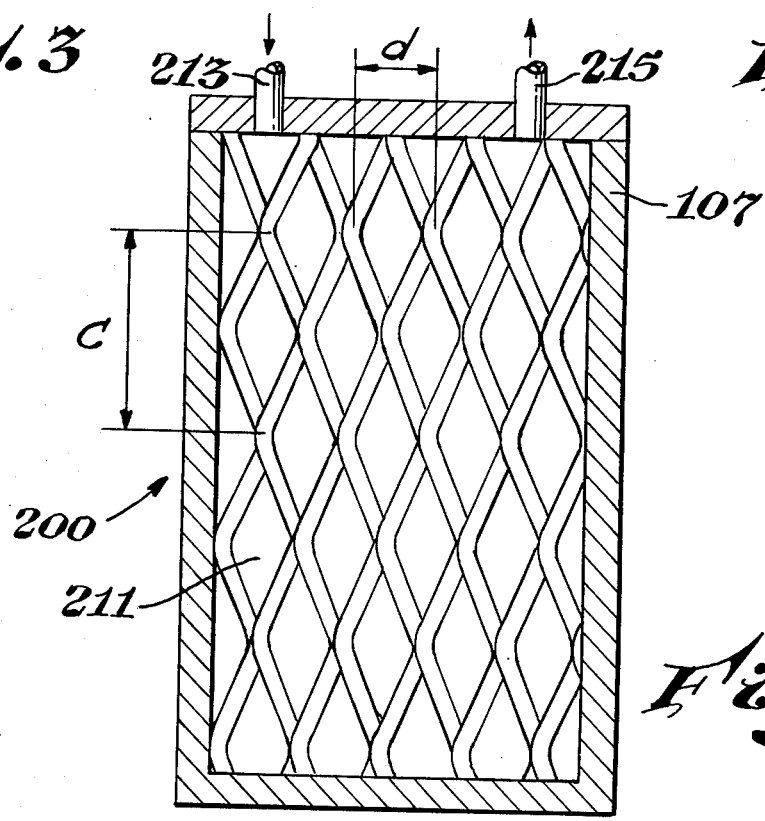
Fig.3
Fig.1
Fig.2

4,469,580

METHOD OF MAKING AN IMPROVED INTERNALLY SUPPORTED ELECTRODE

CROSS REFERENCE TO RELATED APPLICATIONS

This application is a continuation of the copending application Ser. No. 249,256, filed Mar. 30, 1981 now abandoned.

This invention relates to a method of making an improved internally supported electrode and its use as an electrode.

BACKGROUND

Gas electrodes are well known in the art. One type of gas electrode is described in U.S. Pat. Nos. 2,969,315; 3,035,998; 3,238,069 and 3,311,507. These electrodes all have a porous member on at least one surface of the electrode designed to contact an electrolyte. A gas is fed into a gas permeable internal portion of the electrode. The gas is generally although not necessarily under pressure. The gas passes from the internal portion of the electrode into the exposed porous member. There, the gas is involved in some type of electrolytic or galvanic reaction.

The internal portion of these electrodes are sintered, micron-size, metal particles wire gauze or wire mesh, all of which are gas permeable. Each of these electrodes must be supported in some manner. The electrodes having sintered metal particles as their internal portion are usually self-supported. The internal portion is sintered to the porous external member to provide inherent support. However, the sintered internal portion is usually no stronger than the porous external member because they are both constructed from sintered metal particles. Thus, these electrodes are easily broken or pulled apart. Also, pressurized gas which may be supplied to the internal portion will frequently cause the external porous member to separate from the internal portion.

Electrodes having wire gauze or wire mesh interiors are supported by a solid, nonpermeable support plate. (See U.S. Pat. No. 2,969,315.)

SUMMARY OF THE INVENTION

The invention is a method of making an improved internally supported electrode which comprises:

(a) contacting a first exposed member with a plurality of projections located on a first surface of a gas permeable support section;

(b) contacting a second exposed member with a plurality of projections on a second surface of the support section; wherein the projections on each surface are separated by a distance of at least about 0.1 inch;

(c) imbedding at least a portion of the projections into each of the exposed members; and (d) bonding the imbedded projections to each of the exposed members.

The invention includes an electrolytic cell containing the electrode as a cathode, and an electrolytic process using the cathode as a gas electrode.

BRIEF DESCRIPTION OF THE DRAWINGS

FIG. 1 shows one embodiment of the invention. It shows the internal, gas permeable support section prior to the application of the exposed members which are adapted to contact the electrolyte.

FIG. 2 shows a frontal view of the internal support shown in FIG. 1.

FIG. 3 shows the electrode having the internal support and the exposed members attached thereto.

DETAILED DESCRIPTION OF THE DRAWINGS

FIG. 1 shows one embodiment of the support section 100 of the electrode. The figure shows a plurality of projections on each of two surface portions of the support section. Each projection is separated by a distance (c), which should be at least 0.1 inch. The actual separation distance depends upon the use to which the final project will be put. Each projection to exposed member bond has a characteristic tensile strength. Therefore, the more the projections per unit area, the greater the total tensile strength of the article. This means that the density of projections may be adjusted to yield adequate tensile strength (strength to resist an internal gas pressure) and have sufficient open areas such that at the required gas flow rates, undesirably high internal pressure drops are avoided. When gas pressure of from about 5-10 pounds per square inch gauge (psig) is used inside the electrode, and when the exposed members are porous and are dual porosity nickel having a thickness of about 0.1 inch, the projections may be separated by a distance of about 0.5 inch.

As a general rule, tensile strength decreases as the distance between the projections increases. The tensile strength needed will determine the separation distance (c).

For purposes of illustration, the support section is shown as being expanded metal 109. Even though expanded metal is the most preferred embodiment, the support may also be such things as wire screen, a plurality of spheres, a plurality of 3 dimensional articles having projections and a variety of other shaped articles so long as the surface portion of the support section projects a plurality of projections separated by at least about 0.1 inch. The support section may be a plurality of cubes or rectangular shaped articles which project a flat surface toward the exposed member. These shapes will work so long as they are imbedded into and bonded with each exposed member.

The projections should be bonded with the exposed member. Sintering is a convenient, and preferable, method of bonding. However, other methods may be used, such as using an adhesive to bond the projections to the member. Regardless of which bonding method is used, it is necessary for the projections to be imbedded into the member to provide adequate strength. The member may be preformed to have a plurality of indentations spaced apart from each other so that they will correspond with the projections when the exposed member is contacted with the support section.

For illustration purposes, the preferred method of pressing and bonding the parts of the electrode will be described. However, other preparation methods are operable.

For illustration purposes, a preparation method will be described wherein the two exposed members bonded to the support section are porous. However, this preparation method is operable when none, some or all of the members are porous. In an electrode having members attached to opposing sides of the support section, one member may be porous and the other member may be solid.

The support section is defined around its edges by a metal frame 107. It holds the support section 109 in place and ultimately provides a gas seal to the finished electrode. It may be joined with the support section in a variety of ways. One method is to form a hollow, flat rectangular frame and place a sheet of expanded metal thereon. The length and width dimensions of the expanded metal should be slightly less than the corresponding dimensions of the rectangular article. Then, a second hollow, flat rectangular frame having the same dimensions as the first frame is placed on top of the screen. The edges of the so-framed sandwich may then be welded or sealed in some manner. Another way of forming the article 100 is to form a hollow, flat rectangular frame having a groove 113 on its interior edge. The expanded metal may then be inserted into the grooves 113, thus forming the article 100.

A convenient method of preparing the electrode is by constructing the frame 107 with a thickness (a), less than the thickness (b) of the internal support 109. By doing so, a portion of each projection will project above the frame 107. When exposed members are pressed and sintered thereto, the projections will imbed into the exposed member.

FIG. 2 shows another view of the support section 200 shown in FIG. 2. Once again, expanded metal is shown as the support section. The frame 107 described in FIG. 1 is again shown in FIG. 2. Distances between projections (c) are shown in FIGS. 1 and 2. Distance (d) is shown in FIG. 2. This illustrates the fact that the widthwise distance (d) as compared to the lengthwise distance (c) is not necessarily the same. The relationship between these two distances is not critical to the invention. They may be the same distance or different distances, so long as projections are separated by at least about 0.1 inch to provide adequate gas flow.

If the projections have peaks, the separation distance (c) should be measured from peak to peak. If the projections are spheres, or have flat surfaces, the separation distance (c) should be measured from the center of one projection to the center of its adjoining projections, provided there are openings sufficiently large to provide for adequate gas flow.

The expanded metal has a plurality of openings 211 throughout the metal. These openings provide a pathway for gas to travel throughout the electrode's interior. The size of these openings is not critical to the invention provided they are of sufficient size to allow the desired quantity of gas to reach throughout the electrode's interior.

There is provided an opening 213 in the frame 107 of the support section through which gas may be fed into the finished electrode. A gas exit 215 is also provided. These openings may be at the same end of the electrode or at opposite or adjoining sides. Preferably, they should be at opposite ends. One way to conveniently provide for this is to have openings 213 and 215 at the same end of the electrode and attach a tube to opening 213 which opens at the end of the electrode opposite outlet 215.

FIG. 3 shows a finished electrode. The frame 107 and support section 109 are present and exist as described in the discussion of FIGS. 1 and 2. This Figure includes the exposed members 300 and 339 attached to the support section. Exposed members 300 and 339 are shown as being porous members having 2 layers. Each layer has a plurality of interconnecting passageways which connect the interior openings 329 of the support section with the external surface of the exposed members. Layers 325 and 335 have pores with diameters of from about 0.1 to about 5 microns, while layers 327 and 337 have pores with diameters of from about 5 to about 12 microns. Such members are very useful when the cathode is used as a gas cathode for the electrolysis of an alkali metal halide electrolyte. However, the thickness of the exposed members 300 and 339 is not critical to the invention, nor is the number of layers in each member critical. Each member may have only one layer or may have a plurality of layers. As mentioned earlier, the thickness of the exposed members 300 and 339 should be matched with the gas pressure to be placed in the interior of the cathode and with the number and distance between the projections imbedded into the member.

FIG. 3 shows projections 331 and 333 imbedded into and bonded with exposed members 300 and 339. A convenient way to imbed the projections is to first prepare the support section-frame combination described in FIGS. 1 and 2. Place it between two exposed members 300 and 339. Then apply pressure to the exposed surface of the exposed members at a level sufficient to at least partially imbed at least a portion of the projections of the support section into each of the exposed members. Each exposed member may be pressed on individually or they may be pressed on simultaneously. Thereafter, the article may be heated at a temperature sufficient to at least partially sinter the projections to the porous member to bond the parts.

The heat, however, should not be so high to cause softening of the exposed member to the point that substantial quantities of pores in the porous member will be sealed.

Sintering conditions suitable for the herein-described articles are well known in the art. Sintering depends upon temperature, pressure and time. Generally, for porous nickel articles, temperatures in the range of from about 600° C. to about 1200° C. are operable. Pressures may vary between atmospheric and 15 tons per square inch although pressures need not be higher than about 1000 pounds per square inch. Sintering times vary from about 15 minutes to several hours. The particular time, pressure or temperature depend on the other variables and on the type of material being sintered.

In preparing the article herein-described, the imbedding of the projections into the exposed member may be done prior to or simultaneously with the heating step.

The extent to which the projections should be imbedded into the exposed members depends upon the end use conditions to which the electrode will encounter. The more the projections are imbedded, the greater the tensile strength will be of the finished electrode. Increasing surface area contact between the projections and the exposed member yields increased tensile strength of the finished electrode. For an exposed member having a thickness of about 0.07 inch, the projections should be imbedded at least about 0.02 inch into the exposed member. Projections may be imbedded from about 5 to about 95 percent of the thickness of the member exposed. A preferred imbedding depth appears to be equal to about 20–50 percent of the thickness of the exposed member.

The number and frequency of projections imbedded into the exposed members also depend upon the end use to which the electrode will be put. As the number and frequency of projections imbedded into the exposed member increase, the tensile strength of the finished article increases. Electrodes prepared by this method have tensile strengths up to and exceeding 50 pounds per square inch.

When the exposed members are porous and are pressed into the support section, the exposed member areas 341 and 343 adjoining the frame 107 are densified. This densification causes a substantial portion of the pores in the member to be closed. This helps seal the electrode.

When the pressed body is heated, sintering occurs at several locations: at the point where the projections are imbedded into the exposed members 331 and 333, and at the point where the exposed member contacts the frame 107. Minor amounts of sintering also occur within other portions of the electrode. Although sintering is the preferred way of bonding the electrodes for maximum strength, they may be bonded using various adhesives such as epoxy.

Electrodes prepared in this manner are very useful as gas electrodes because they are substantial and are not prone to breaking or separation. They are particularly useful as oxygen depolarized cathodes in the electrolysis of alkali metal halide solutions to form halogens and alkali metal hydroxides. These electrodes may be used in conventional diaphragm-type electrolytic cells or in the newer ion exchange membrane cells.

The electrode may contact the diaphragm or ion exchange membrane, or it may be spaced apart therefrom.

In operation as an oxygen depolarized cathode in an electrolytic cell for the electrolysis of a NaCl brine to form $Cl_2$ and NaOH, the electrode is placed in the cathode compartment. An anode is located in an anode compartment. The anode and cathode compartments may be separated by a diaphragm or ion exchange membrane.

An aqueous NaCl solution is fed to the anode compartment and an oxygen-containing gas is flowed into the interior portion of the cathode. Electrical current is passed between the anode and the cathode at a voltage sufficient to cause electrolytic reactions to occur. Chlorine gas is produced at the anode and NaOH is produced at the cathode. The products of electrolysis may then be removed.

The herein-described electrode may be used in any process using a gas electrode, including fuel cells and cells making hypochlorites. Such cells may or may not include a separator between the anode and the cathode, such as those for the production of hypochlorites.

The following examples illustrate a method for making the electrode and a method of using the electrode as an oxygen-depolarized cathode. However, they do not limit the use of the electrode or its preparation method to that described in the examples.

EXAMPLE 1

A two-sided electrode with an active area of approximately 1 inch × 3 inches on each side was prepared as follows:

A support frame was prepared by welding nickel plate to the edges of a nickel screen (4 mesh wire diameter of 0.080 inch). This edging was then machined to a thickness of 0.187 inch. A piece of a dual layer porous nickel plaque (fine pore layer—0.035 inch, 1.4 $\mu$m pores, 28% porosity; coarse layer—0.050 inch, 6.7 $\mu$m pores, 78% porosity) was pressed onto each side of the support frame at 20,000 pounds (~3800 psi). These pieces were then transferred to a clamping arrangement to apply pressure and provide proper alignment during the sintering operation. The entire assembly was placed in a retort and heated under pre-purified nitrogen at 700° C. for 30 minutes. After cooling to room temperature, the finished electrode was measured and it was determined that the projections of the screen had become imbedded into the porous nickel plaque to a depth of 0.046 inch into each side of the article.

EXAMPLE 2

A 4 inch × 12 inch rectangular opening was cut in a 5 inch × 13 inch × 0.5 inch thick steel plate. A portion of unflattened expanded steel mesh with a peak to peak thickness of nominally 0.300 inch was cut to fit snugly in this opening. The metal mesh was then welded to the steel edging. The edging plate was machined to a nominal thickness of 0.280 inch centered on the centerline of the metal mesh. The entire article was nickel plated. Two 5 inch × 13 inch porous nickel plaques (0.035 inch of 1.4 $\mu$m pores, 28% porosity; 0.050 inch of 6.7 $\mu$m pores, 78% porosity) were centered on each side of the support piece and pressed onto it at 50,000 pounds (~800 psi). These pieces were then transferred to a clamping frame to provide pressure and alignment during the sintering step. This assembly was placed in a retort and heated under pre-purified nitrogen at 700° C. for 30 minutes. No measurements of the extent of imbedment of the expanded metal into the porous metal were made, but similarly prepared pieces without edging shows that the projections of the expanded metal penetrated approximately 0.050 inch into the porous nickel plaques. This piece has undergone extensive temperature and internal gas pressure cycling for extended periods with no indication of deterioration in strength.

EXAMPLE 3

Two 2 inch × 2 inch squares of the porous nickel plaque described in Example 1 were pressed onto opposing sides of a 4 mesh nickel wire screen (wire diameter 0.080 inch) at 520 pounds (130 psi). These three pieces were transferred to a clamping frame and the whole assembly heated in a retort under pre-purified nitrogen at 685° C. for 30 minutes. After cooling to ambient temperature, metal holders were attached to the exterior flat faces of the porous nickel with a fastsetting epoxy formulation. These holders were designed to fit the jaws of a tensile testing machine. Once the epoxy had hardened and the sample had been properly positioned in the tensile testing machine, a gradually increasing tensile pressure was applied until the sintered bonds failed. This occurred at 200 pounds (50 psi).

EXAMPLE 4

An electrode prepared in a manner similar to that of Example 1 had an oxygen reduction catalyst deposited on it by impregnating the porous metal parts with an aqueous solution of potassium permanganate followed by a thermal decomposition of the reagent to yield a catalytically active surface. This electrode was operated as a cathode in an electrolytic cell. This electrolytic cell contained 2 anodes of the DSA ® type (one on either side of the cathode) and a Nafion ® 324 ion exchange membrane which served as separator between the anode and cathode compartments. The anode compartments were fitted with inlets for sodium choloride brine and outlets for spent brine and chlorine gas. The cathode compartment was fitted with an inlet for water and an outlet for the sodium hydroxide produced. The cathode itself was fitted with an inlet and outlet for oxygen containing gas. An NaCl brine was fed to the anode compartment. The brine temperature was controlled at about 74° C. Oxygen gas was provided to the interior of the cathode at a pressure of about 3.5 pounds per square inch. The cell was operated at a voltage of about 1.91 volts with a current density at the cathode of about 0.5 amps per square inch. Chlorine gas was produced at the anode and 2.6 molar NaOH was produced at the cathode.

What is claimed is:

1. A method for making an internally supported electrode which comprises:
   (a) contacting a first exposed member with a plurality of projections which extend from a first surface of a gas permeable support section;
   (b) contacting a second exposed member with a plurality of projections which extend from a second surface of the gas permeable support section;
   (c) imbedding at least a portion of the projections into the contacting surfaces of each of the exposed members; and
   (d) bonding the imbedded projections to each of the exposed members 2. The method of claim 1 wherein the contacting surface of each exposed member is preformed to provide a plurality of indentations designed to accept the projections of the gas permeable support section.

3. The method of claim 1 wherein the projections of the gas permeable section are imbedded into at least one of the exposed members by applying external pressure to the electrode.

4. The method of claim 1 wherein the projections are imbedded into the exposed members to a depth equal to from about 20 to about 50 percent of the thickness of each of the exposed members.

5. The method of claim 1 wherein the projections are bonded to the exposed members by heating the electrode for a time and at a temperature sufficient to at least partially sinter the projections to at least one of the exposed members.

6. The method of claim 5 wherein external pressure is applied to the electrode during heating.

7. The method of claim 5 wherein the heating temperature is between 600° C. and 1200° C.

8. The method of claim 1 which further comprises bonding the gas permeable support section to a frame prior to contacting the gas permeable support section with the exposed members.

9. The method of claim 8 wherein the thickness of the frame is less than the thickness of the gas permeable support section.

10. The method of claim 8 wherein the thickness of the frame is approximately equal to the thickness of the gas permeable support section.

* * * * *